United States Patent
Wolters et al.

(10) Patent No.: US 6,729,637 B2
(45) Date of Patent: May 4, 2004

(54) SIDE SWING HITCH FOR AN AGRICULTURAL COMBINE

(75) Inventors: Joshua J. Wolters, Geneseo, IL (US); Robert A. Matousek, Milan, IL (US); Dohn Pfeiffer, Davenport, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/163,183

(22) Filed: Jun. 4, 2002

(65) Prior Publication Data

US 2003/0222427 A1 Dec. 4, 2003

(51) Int. Cl.⁷ .............................................. B60D 1/155
(52) U.S. Cl. ................. 280/491.3; 280/491.1; 280/495; 280/503
(58) Field of Search ................ 280/491.1, 491.3, 280/495, 500, 503

(56) References Cited

U.S. PATENT DOCUMENTS

| | | | |
|---|---|---|---|
| 1,973,766 A | | 9/1934 | Johnson .................... 280/33.15 |
| 2,138,512 A | | 11/1938 | Rogers ....................... 280/33.1 |
| 2,614,861 A | | 10/1952 | Van Horn ................ 280/33.15 |
| 2,745,680 A | | 5/1956 | Achenbach et al. ......... 280/499 |
| 3,578,358 A | * | 5/1971 | Reynolds .................... 280/500 |
| 3,649,048 A | | 3/1972 | Garnett ....................... 280/477 |
| 3,979,138 A | * | 9/1976 | George et al. ............ 280/478.1 |
| 4,029,333 A | | 6/1977 | Christensen ................ 280/415 |
| 4,159,833 A | | 7/1979 | Meiners ................... 280/478 R |
| 4,204,702 A | * | 5/1980 | Oltrogge ................... 280/491.5 |
| 4,438,945 A | * | 3/1984 | Curtis ........................ 280/501 |
| 4,552,375 A | * | 11/1985 | Kinzenbaw ................. 172/248 |
| 4,978,134 A | * | 12/1990 | Dahl et al. ............... 280/491.4 |
| 5,232,240 A | | 8/1993 | Johnson ................... 280/491.5 |
| 5,322,315 A | | 6/1994 | Carsten .................... 280/479.2 |
| 5,503,423 A | | 4/1996 | Roberts et al. .......... 280/491.3 |
| RE35,482 E | | 3/1997 | Johnson ................... 280/491.5 |
| 5,992,871 A | | 11/1999 | Rowland et al. ......... 280/491.3 |

* cited by examiner

Primary Examiner—Lesley D. Morris
Assistant Examiner—L. Lum
(74) Attorney, Agent, or Firm—John William Stader; Collin A. Webb

(57) ABSTRACT

A side swing hitch for a rear end of an agricultural combine. The hitch includes a hitch support bracket having opposite end portions and an intermediate portion therebetween, a first of the end portions including at least one element for mounting to a rear chassis member of the combine with the other end portion suspended in a position rearward of the rear axle assembly connected to the chassis member. A draw bar is pivotally mounted to the second end portion of the hitch support bracket for pivotal movement between a rearwardly extending towing position generally perpendicular to the rear axle assembly and at least one generally transversely extending stored position at least generally perpendicular to the towing position and beside the rear axle assembly, the draw bar having an opposite end including a hitch element connectable to a tongue of a vehicle such as a trailer or cart to be towed by the combine.

16 Claims, 4 Drawing Sheets

SIDE SWING HITCH FOR AN AGRICULTURAL COMBINE

TECHNICAL FIELD

This invention relates generally to agricultural combines, and more particularly, to a hitch for a rear end of a combine, which hitch is quickly and easily installable and removable from the rear of the combine and when installed is movable between a towing position extending rearwardly relative to a rear axle assembly of the combine for connection to a tongue of a vehicle such as a trailer or cart, such as a header cart, to be towed by the combine, and a stored position generally perpendicular to the towing position and beside the rear axle assembly wherein the hitch will not significantly obstruct straw discharged from the combine for forming windrows on an agricultural field, nor obstruct access to cleaning apparatus and other apparatus in the rear end of the combine for inspection, maintenance, service, and the like.

BACKGROUND ART

It is well known to provide a hitch on the rear end of an agricultural combine to allow connection of the tongue of a trailer or cart such as a header cart to the combine for towing thereby. It is desirable for the hitch to be located sufficiently rearwardly of a rear axle assembly of the combine to allow convenient connection of the trailer or cart tongue thereto. However, such location has been found to present a problem when it is desired for straw to be discharged through a rearward opening of the combine located above the hitch, for forming windrows on an agricultural field, as the hitch will be directly in the path of the straw and can undesirably affect the distribution of the straw and thus the shape and consistency of the windrow. The hitch can also be a nuisance and obstacle for someone working in the rear portion of the combine, particularly when inspecting, servicing and maintaining cleaning apparatus and other apparatus of the combine located in the area above the rear axle assembly, and can be an obstruction to positioning apparatus such as a spreader or chopper in a desired position or orientation just rearwardly of the cleaning apparatus for receiving crop residue therefrom.

According, what is sought is a hitch for an agricultural combine which is conveniently and easily installable and located for connection of a trailer or cart or other vehicle thereto for towing, and which hitch can be conveniently and easily moved from a rearwardly extending towing position to a stored position close to or generally beside the rear axle assembly.

SUMMARY OF THE INVENTION

According to the present invention, a side swing hitch for the rear end of an agricultural combine which provides many of the above sought properties is disclosed. The rear end of the combine includes a transversely extending rear axle assembly located beneath and connected in supportive relation to a rear chassis or frame member of the combine. The side swing hitch includes a hitch support bracket preferably of unitary construction and having a first end portion, an opposite second end portion, and an intermediate portion disposed between the first end portion and the second end portion. The first end portion of the bracket includes at least one element for easy and convenient mounting to the chassis or frame member for suspending or otherwise positioning the second end portion below the first end portion and rearwardly of the rear axle assembly. The second end portion includes a pivotal draw bar mount supporting a mounting end of a draw bar for horizontal pivotal movement about a generally vertical pivotal axis between a rearwardly extending towing position generally perpendicular to the rear axle assembly, and at least one generally transversely extending stored or folded position beside the rear axle assembly. The draw bar mount and the draw bar include cooperatively engageable elements for holding the draw bar in the towing position, such as holes in both which are aligned when the draw bar is in the towing position, for removably receiving a pin for holding the draw bar in that position. The draw bar includes a second or free end opposite the mounting end including a hitch element connectable to a tongue of a trailer or cart to be towed by the combine. The hitch element can optionally include a standard clevis pin hitch, a ball type hitch, a European automatic hitch, or any other desired hitch construction, and can be permanently or removably mounted or attached to the draw bar, as desired.

DETAILED DESCRIPTION OF THE INVENTION

Figure 1:
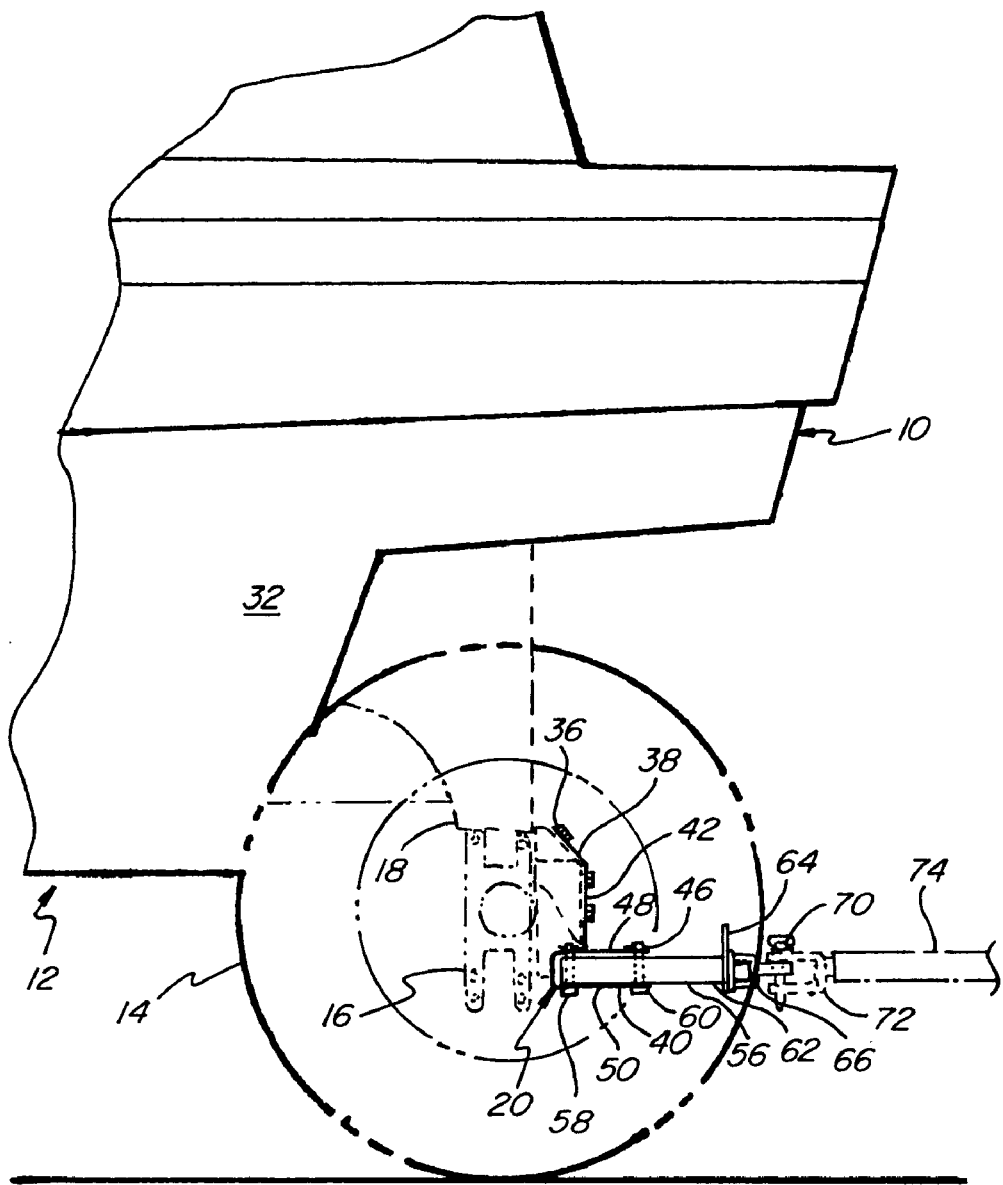
FIG. 1 is a simplified fragmentary side view of the rear end of an agricultural combine including a side swing hitch according to the invention.
Figure 2:
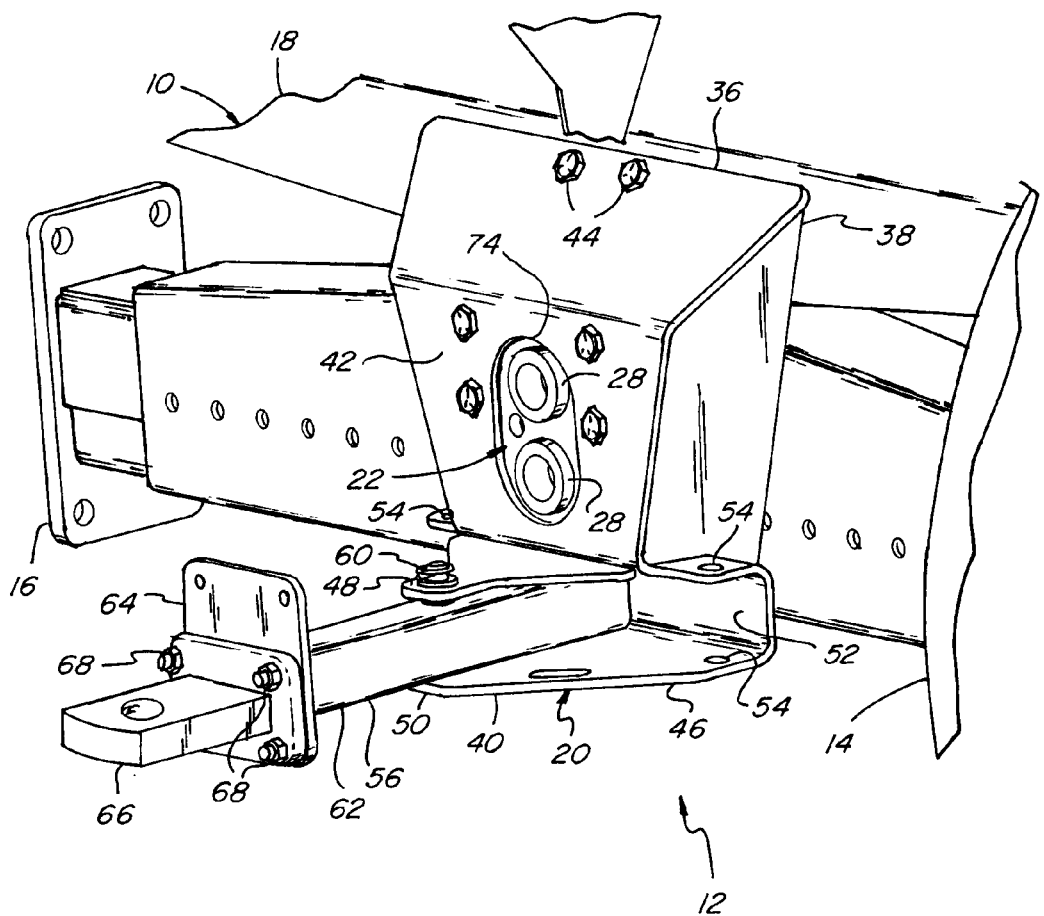
FIG. 2 is a fragmentary perspective view of the rear end of the combine of FIG. 1, showing a rear axle assembly and a rear chassis member of the combine, and the side swing hitch in a towing position.

Referring now to the drawings, wherein a preferred embodiment of the present invention is shown, FIGS. 1 and 2 show a rear end 10 of a typical agricultural combine 12, which is a self-propelled machine movable over an agricultural field for harvesting crops and separating the crops from plant material such as stalks, pods, and the like, and collecting and holding the crops in the conventional and well known manner. Rear end 10 of combine 12 includes a pair of conventional rear wheels 14 rotatably mounted to and supporting a rear axle assembly 16, which in turn is pivotally connected to and supports a frame or rear chassis member 18 connected to and supporting rear end 10.

Figure 3:
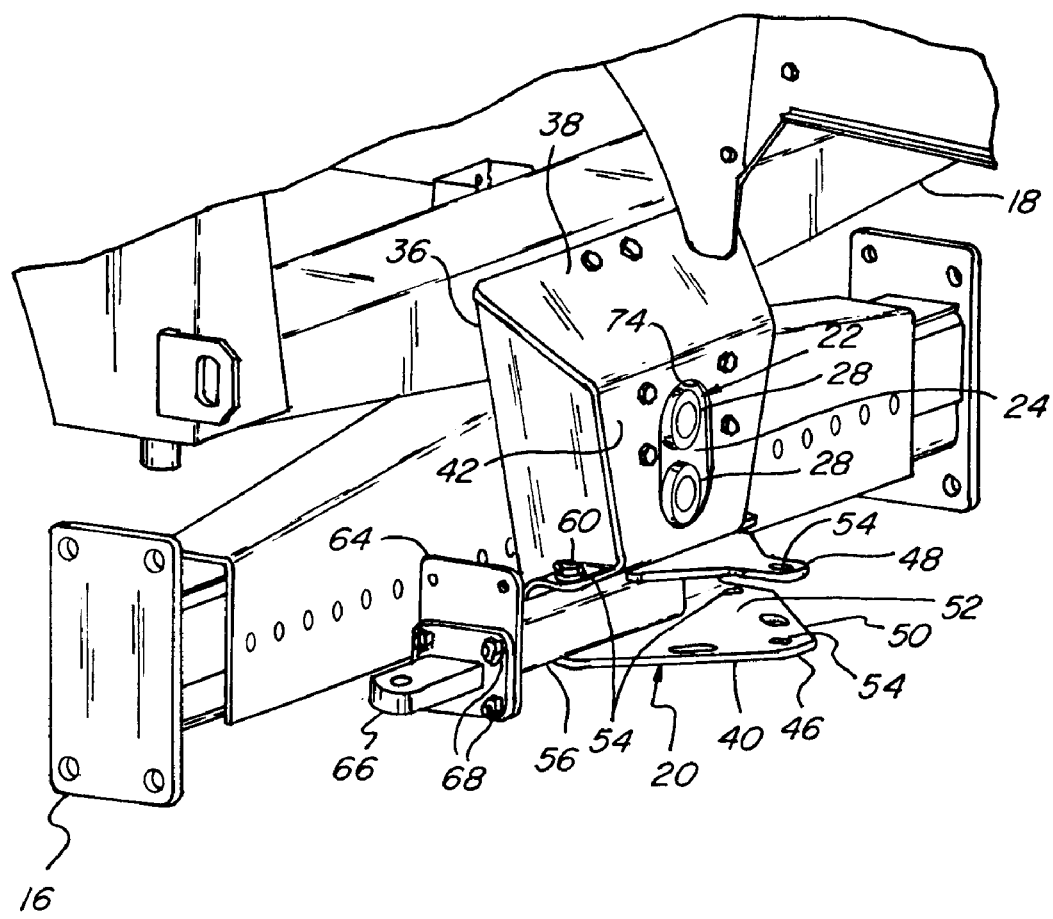
FIG. 3 is another fragmentary perspective view of the rear end of the combine of FIGS. 1 and 2, showing the rear axle assembly and rear chassis member, with the hitch in a folded or stored position.
Figure 4:
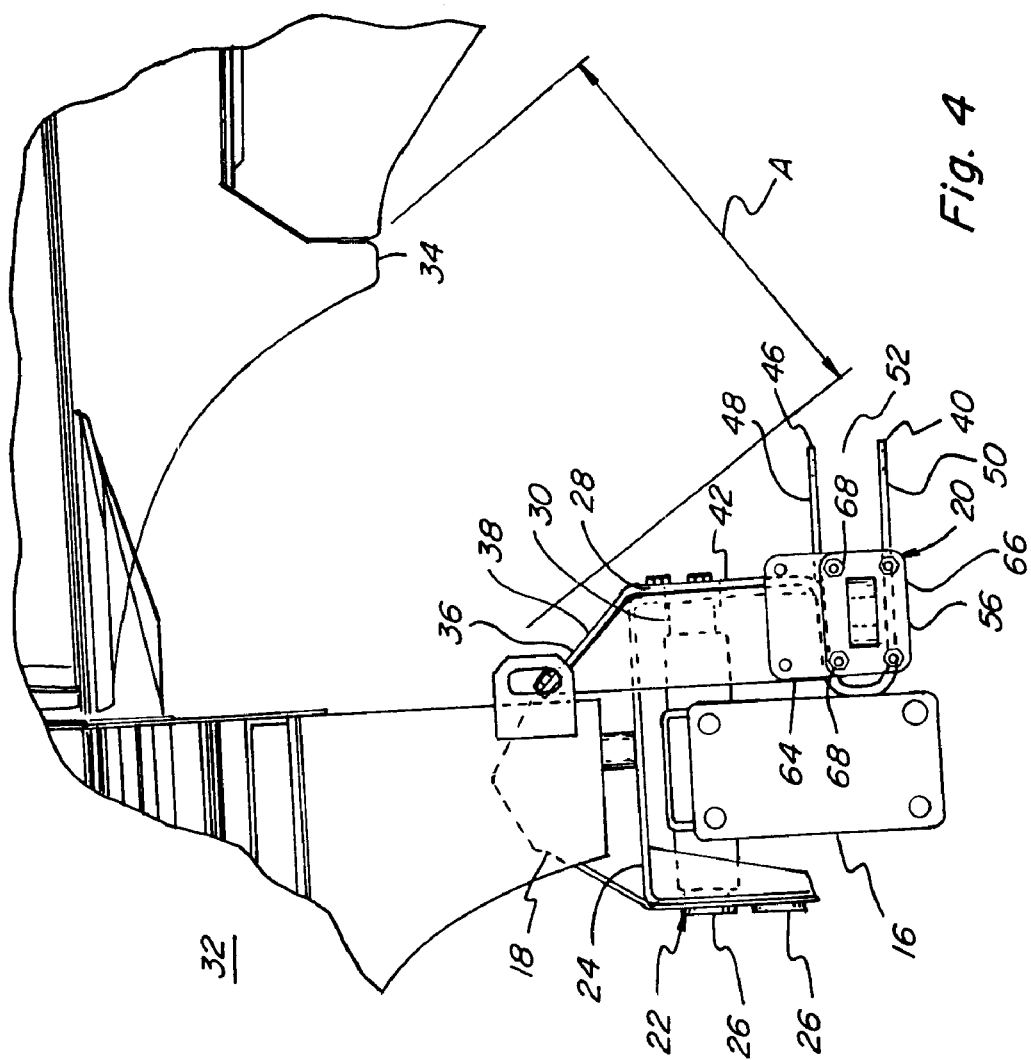
FIG. 4 is a fragmentary side view of the rear end of the combine of FIGS. 1–3, showing the relationship of the hitch to the rear axle assembly when the hitch is in the stored or folded position.

Referring also to FIGS. 3 and 4, rear axle assembly 16 is pivotally connected to rear chassis member 18 by a pivot joint arrangement 22 including a clevis 24 mounted on and extending downwardly from member 18, which clevis 24 has a predetermined outer shape including a generally sloped upper portion and a vertical lower portion, and which clevis 24 supports pairs of aligned forward and rearward pivot bearings 26 and 28, respectively, a selected one of the aligned pairs of bearings 26, 28 receiving a pivot pin 30 which extends through a central portion of rear axle assembly 16 for pivotally connecting it to chassis member 18. The selection of upper or lower pair of bearings 26, 28 for receiving pivot pin 30 will typically depend on a variety of factors, including the size of rear wheels 14 used, ground clearance requirements, overall height limitations, and the like. Because pivot pin 30 bears at least a substantial portion of the weight of rear end 10, which weight will typically be in excess of 10,000 pounds, pivot joint arrangement 22, and particularly bearings 26, 28 and pin 30, will require periodic inspection and lubrication, and occasional maintenance, disassembly, and repair. Also, because rear chassis member 18 supports a substantial portion of the weight of rear end 10, it is a relatively strong structural member. Its rearward and relatively low location and strength make member 18 suitable for attachment of a hitch, such as the present side swing hitch 20, to combine 12. However, it is desirable that any hitch connected to combine 12 at this location should accommodate the need to inspect, lubricate, service and maintain pivot joint arrangement 22, as required, preferably without requiring removal or disassembly of the hitch. With reference particularly to FIGS. 1 and 4, at times when using combine 12, it is desirable to inspect, perform maintenance, and/or repair cleaning apparatus of combine 12 (not shown), located generally just forwardly of and above rear chassis member 18, in the area generally as denoted at 32. For these functions, an access space, denoted by distance A (FIG. 4), is desirably provided generally between rear chassis member 18 and a rear housing 34 located above and rearwardly of chassis member 18. Typically, an operator or service person must bend over or even crouch below rear housing 34 to gain entry to the access space, and the presence of a rearwardly extending hitch could present an obstacle to free movement in this area. Additionally, when windrowing straw, that is, when straw separated from the crop by combine 12 is desired to be deposited on a field in a narrow row behind the combine as it is moving forwardly over the field for later baling, the straw will typically exit combine 12 between rear housing 34 and chassis member 18, and any hitch extending into this area could interfere with the flow of straw from combine 12 and the formation of the windrow.

To overcome the above problems, the present side swing hitch 20 is easily and quickly installable on combine 12 and once installed, is pivotally movable between a towing position (FIG. 1) and one or more stored or folded positions (FIGS. 3 and 4) extending generally parallel to and beside rear axle assembly 16, perpendicular to the towing position. Hitch 20 is installed and mounted to and supported on rear chassis member 18 by a hitch support bracket 36 having a first end portion 38, an opposite second end portion 40, and an intermediate portion 42 disposed between end portions 38 and 40. Hitch support bracket 36 is preferably of unitary construction for ease of installation, and has an overall shape generally corresponding to the shape of the center portion of the outer surface of the rear end of chassis member 18 and pivot joint arrangement 22, so as to be positionable in at least partial overlaying relation thereto as shown, and quickly and easily fastened in place. First end portion 38 includes a plurality of holes therethrough at a rearward facing, easy to reach location, which holes receive fasteners such as mounting bolts 44 which are received in correspondingly located holes in either or both rear chassis member 18 or that portion of pivot joint arrangement 22 rigidly connected thereto. Additional bolts 44 extend through holes in intermediate portion 42, and all of the bolts are received in correspondingly located holes in member 18 or pivot joint arrangement 22, such that bracket 36 can be secured in position using nuts or the like or direct threaded attachment to member 18 and/or arrangement 22. Second end portion 40 of bracket 36 includes a bifurcated draw bar mount 46 including an upper plate 48 and a lower plate 50 defining a space 52 therebetween. Upper and lower plates 48 and 50 extend rearwardly relative to intermediate portion 42, and also transversely or sidewardly beside rear axle assembly 16, preferably in both directions. Upper and lower plates 48 and 50 include a pair of vertically aligned holes 54 at at least one central rearward location therethrough, as best shown in FIG. 3, and preferably, at least one additional pair of aligned holes 54 at a sideward location, as best shown in FIG. 2. A draw bar 56 has one end mounted between plates 48 and 50 by a pivot pin 58 at a central, forward location within space 52, for pivotal movement of draw bar 56 between the rearwardly extending towing position (FIGS. 1 and 2), and at least one transversely or sidewardly extending stored or folded position beside rear axle assembly 16 (FIGS. 3 and 4) at least generally perpendicular to the towing position. Draw bar 56 is securable in the towing position by a pin 60 cooperatively receivable in rearwardly located holes 54 and a vertically extending passage through draw bar 56 aligned with the holes, as shown in FIGS. 1 and 2. Additionally, preferably, when in either of the stored or folded positions beside rear axle assembly 16, pin 60 is cooperatively receivable in sidewardly positioned holes 54, which are aligned with the passage through draw bar 56 when it is in the stored position, as shown in FIG. 3. Draw bar 56 includes a free end 62 opposite the end thereof connected by pivot pin 58 to bracket 36, end 62 preferably including a generally vertically extending mounting plate 64 on which a hitch element 66 is preferably removably mounted using a plurality of suitable fasteners, such as bolts and nuts 68 or the like. Here, hitch element 66 is depicted as a conventional hitch tongue having a hole therethrough for receiving a pin 70 of a conventional clevis 72 (FIG. 1) on a tongue 74 of a trailer or cart, such as a header cart (not shown) typically desired to be towed by a combine such as combine 12. It should also be understood that hitch element 66 could alternatively include any other desired hitch element, such as, but not limited to, a hitch ball, or a European automatic hitch, which can be permanently or removably mounted to draw bar 56, as desired.

To use side swing hitch 20, draw bar 56 is positioned in the rearwardly extending position and pin 60 inserted through the hole through draw bar 56 and holes 54 in plates 48 and 50. The trailer or cart can then be connected to hitch element 66 in a suitable conventional manner and combine 12 is ready for towing. If it is desired to windrow straw, or to enter the rear of the combine, for instance, to access location 32, for instance, for inspecting, servicing, or adjusting the cleaning apparatus or other mechanisms of combine 12 located within rear end 10, pin 60 is merely removed, and draw bar 56 pivoted to one of the transversely extending stored positions. Pin 60 can then be inserted through holes 54 in plates 48 and 50 and through the corresponding hole in draw bar 56 for securing it in the selected stored position, if desired. Referring particularly to FIGS. 2 and 3, hitch support bracket 36 optionally and preferably includes a centrally located elongate hole 74 therethrough which is generally aligned with and exposes pivot bearings 28 for inspection, service, maintenance, and/or removal of pivot pin 30, as required or desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates several preferred embodiments of the invention and methods of operation of the same; however, concepts, as based upon the description, may be employed in other embodiments without departing from the scope of the invention. Accordingly, the following claims are intended to protect the invention broadly as well as in the specific form shown.

What is claimed is:

1. A side swing hitch for a rear end of an agricultural combine, the rear end including a transversely extending rear axle assembly located beneath and connected in supportive relation to a rear chassis member of the combine, the hitch comprising:

a hitch support bracket having a first end portion, an opposite second end portion, and an intermediate portion disposed between the first end portion and the second end portion, the first end portion including at least one element for mounting to the chassis member with the second end portion suspended by the first end portion rearwardly of the rear axle assembly, the second end portion including a pivotal draw bar mount supporting one end of a draw bar for generally horizontal pivotal movement of the draw bar between a rearwardly extending towing position generally perpendicular to the rear axle assembly and at least one generally transversely extending stored position at least generally perpendicular to the towing position and beside the rear axle assembly, the draw bar mount and the draw bar including cooperatively engageable elements for holding the draw bar in the towing position, the draw bar including a second end opposite the one end and including a hitch element connectable to a tongue of a trailer or cart to be towed by the combine, and wherein the intermediate portion of the hitch support bracket includes a surface having a hole therethrough which is at least generally aligned with a connecting pin pivotally connecting the rear axle assembly to the rear chassis member for allowing accessing and servicing the pin through the hole.

2. The hitch of claim 1 wherein the cooperatively engageable elements include holes in the draw bar mount and the draw bar which are aligned when the draw bar is in the towing position for removably receiving a pin for holding the draw bar in the towing position.

3. The hitch of claim 1, wherein the rear axle assembly is pivotally connected to the rear chassis member by a pivot joint arrangement which projects rearwardly of the rear axle assembly and has a predetermined shape, and the first end portion and the intermediate portion of the hitch support bracket have a predetermined shape corresponding to the predetermined shape of the pivot joint arrangement.

4. The hitch of claim 3, wherein at least one of the first end portion and the intermediate portion of the hitch support bracket includes holes therethrough positioned in alignment with holes through the pivot joint arrangement, such that the hitch support bracket can be removably mounted in overlaying relation to the pivot joint arrangement by a plurality of fasteners.

5. On an agricultural combine including a rear end having a transversely extending rear axle assembly located beneath and connected in supportive relation to a rear chassis member of the combine, an improvement comprising:

a draw bar having one end supported on the rear chassis member for pivotal movement of the draw bar relative thereto between a towing position extending rearwardly from and substantially perpendicular to the chassis member, and at least one stored position beside the rear axle assembly generally perpendicular to the towing position, wherein the draw bar includes an end opposite the one end including a hitch element for connection of a vehicle to be towed behind the combine thereto.

6. The combine of claim 5, wherein the rear axle assembly and the chassis member are pivotally connected together by a pivot joint arrangement which extends rearwardly thereof and has a predetermined shape, and the draw bar is pivotally connected to the chassis member by a hitch support bracket having a predetermined shape corresponding to the predetermined shape of the pivot joint arrangement so as to be positioned in at least partial overlaying relation thereto.

7. The combine of claim 6, wherein the pivot joint arrangement includes at least one bearing supporting a pivot pin connecting to the rear axle assembly, and the hitch support bracket includes a hole therethrough at least generally aligned with the at least one bearing for allowing access thereto through the hole.

8. A side switch hitch assembly for removably mounting to a rear chassis member of an agricultural combine, the chassis member including a pivot joint arrangement extending downwardly and rearwardly therefrom generally centrally relative to the sides of the combine, the hitch comprising:

a unitary hitch support bracket including a portion having a shape corresponding at least generally to the predetermined shape of the pivot joint arrangement so as to be positionable in at least partially overlaying relation thereto, such that a second portion of the bracket will be positioned rearwardly of the pivot joint arrangement, and fasteners for removably mounting the bracket to the pivot joint arrangement; and a draw bar having one end supported on the bracket for pivotal movement of the draw bar relative thereto when mounted to the pivot joint arrangement between a towing position extending rearwardly therefrom and perpendicular to a rear axle assembly of the combine, and at least one stored position beside the rear axle assembly perpendicular to the towing position.

9. The hitch of claim 8, wherein the draw bar includes an end opposite the one end including a hitch element for connection of a vehicle to be towed behind the combine thereto.

10. The hitch of claim 8, wherein the pivot joint arrangement includes at least one bearing supporting a pivot pin connecting to the rear axle assembly, and the hitch support bracket includes a hole therethrough at least generally aligned with the at least one bearing for allowing access thereto through the hole.

11. A side swing hitch for a rear end of an agricultural combine, the rear end including a transversely extending rear axle assembly located beneath and connected in supportive relation to a rear chassis member of the combine, the hitch comprising:

a hitch support bracket having a first end portion, an opposite second end portion, and an intermediate portion disposed between the first end portion and the second end portion, the first end portion including at least one element for mounting to the chassis member with the second end portion suspended by the first end portion rearwardly of the rear axle assembly, the second end portion including a pivotal draw bar mount supporting one end of a draw bar for generally horizontal pivotal movement of the draw bar between a rearwardly extending towing position generally perpendicular to the rear axle assembly and at least one generally transversely extending stored position at least generally perpendicular to the towing position and beside the rear axle assembly, the draw bar mount and the draw bar including cooperatively engageable elements for holding the draw bar in the towing position, the draw bar including a second end opposite the one end and including a hitch element connectable to a tongue of a trailer or cart to be towed by the combine, wherein the rear axle assembly is pivotally connected to the rear chassis member by a pivot joint arrangement which projects rearwardly of the rear axle assembly and has a predetermined shape, and the first end portion and the intermediate portion of the hitch support bracket have a predetermined shape corresponding to the predetermined shape of the pivot joint arrangement.

12. The hitch of claim 11 wherein the intermediate portion of the hitch support bracket includes a surface having a hole therethrough which is at least generally aligned with a connecting pin pivotally connecting the rear axle assembly to the rear chassis member for allowing accessing and servicing the pin through the hole.

13. The hitch of claim 11, wherein at least one of the first end portion and the intermediate portion of the hitch support bracket includes holes therethrough positioned in alignment with holes through the pivot joint arrangement, such that the hitch support bracket can be removably mounted in overlaying relation to the pivot joint arrangement by a plurality of fasteners.

14. On an agricultural combine including a rear end having a transversely extending rear axle assembly located beneath and connected in supportive relation to a rear chassis member of the combine, an improvement comprising:

a draw bar having one end supported on the rear chassis member for pivotal movement of the draw bar relative thereto between a towing position extending rearwardly from and substantially perpendicular to the chassis member, and at least one stored position beside the rear axle assembly generally perpendicular to the towing position, wherein the rear axle assembly and the chassis member are pivotally connected together by a pivot joint arrangement which extends rearwardly thereof and has a predetermined shape, and the draw bar is pivotally connected to the chassis member by a hitch support bracket having a predetermined shape corresponding to the predetermined shape of the pivot joint arrangement so as to be positioned in at least partial overlaying relation thereto.

15. The combine of claim 14, wherein the pivot joint arrangement includes at least one bearing supporting a pivot pin connecting to the rear axle assembly, and the hitch support bracket includes a hole therethrough at least generally aligned with the at least one bearing for allowing access thereto through the hole.

16. The combine of claim 14, wherein the draw bar includes an end opposite the one end including a hitch element for connection of a vehicle to be towed behind the combine thereto.

* * * * *